Aug. 27, 1929.  J. C. COULOMBE  1,726,288

DIFFERENTIAL DRIVE FOR MOTOR VEHICLES

Filed Dec. 21, 1925

INVENTOR.
Joseph C. Coulombe

Patented Aug. 27, 1929.

1,726,288

UNITED STATES PATENT OFFICE.

JOSEPH C. COULOMBE, OF KOKOMO, INDIANA.

DIFFERENTIAL DRIVE FOR MOTOR VEHICLES.

Application filed December 21, 1925. Serial No. 76,780.

This invention relates to differential drives for motor vehicles, and particularly to differential drives of the type utilizing a cam action to allow differential rotation of the driven wheels.

The principal object of the invention is to provide novel, simple and efficient means of differential movement between the driven wheels.

Figure 1:
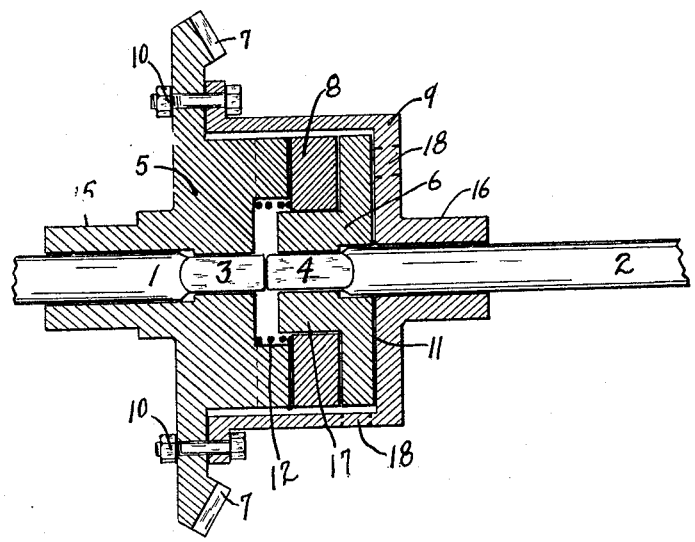
Figure 1 is a sectional view.
Figure 2:
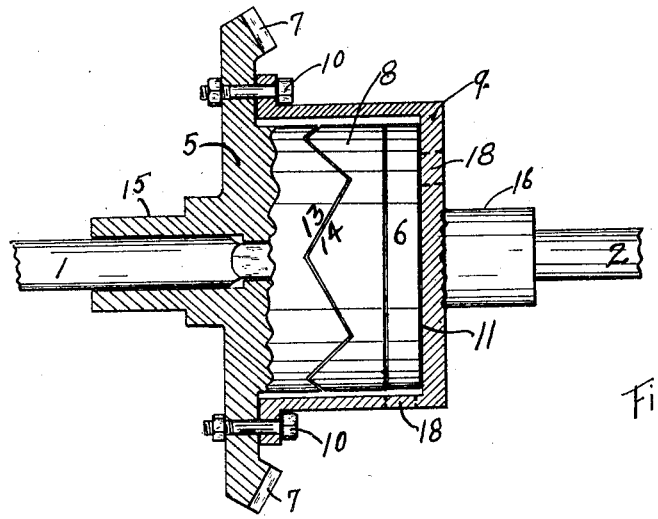
Figure 2 is a partly sectional view.

1 and 2 indicate the two drive shafts attached to the two drive wheels (not shown), and having squared ends 3 and 4 positively engaging the drive members 5 and 6, respectively. 7 indicates the drive gear, which may be formed on the drive member 5 or made as a separate piece and secured to said member 5. A cam member 8 is interposed between members 5 and 6. A housing 9 is secured to member 5 by bolts 10. Cam member 8 is supported in position by the hub portion 17 of drive member 6. The spring 12 is interposed between the drive member 5 and the cam member 8 to exert a primary pressure between cam member 8 and friction drive member 6, to take up the play between said members and insure that the cam pressure will be exerted by the cam surfaces 13 and 14, respectively located on members 5 and 6, otherwise the cam member 8 is likely to be carried around freely without contacting with member 6. The housing 9 is perforated as indicated by 18 to allow lubricant for the working parts. The hub portions 15 and 16 provide the bearings for the unit.

The operation is as follows:

The drive shaft 1 is always positively driven. The drive shaft 2 is driven through the friction clutch action of the drive member 6, by the pressure exerted by the cam surfaces 13 and 14 which forces cam member 8 away from drive member 5, binding the drive member 6 between the surface 11 of housing 9 and the cam member 8. On rounding a curve, when the drive shaft 2 is rotated faster than shaft 1, shaft 2 carries the cam member 8 forward relieving the cam pressure and allowing the drive member 6 and shaft 2 to rotate comparatively free. On rounding a curve in the opposite direction, when the drive shaft 2 should rotate slower than shaft 1, shaft 2 forces the drive member to slip against the frictional engagement caused by the cam pressure. On down grade when the engine is used as a brake, the positively driven shaft 1 does practically all the driving. When there is no traction for shaft 1 the driving force is all transferred to shaft 2, through the cam action.

Inasmuch as there is an easier differential action if shaft 2 rotates faster than shaft 1, and inasmuch as turns to the right are sharper, as a rule, than turns to the left, it is advisable to arrange the parts so that right turns will cause shaft 2 to rotate faster than shaft 1.

I claim:

1. A differential mechanism comprising a cam member positively connected to one axle, a differential casing, a friction member within said casing and positively connected to a second axle, said cam member having an assembly flange, cam surfaces on said cam member raised entirely above said flange, a second cam member within said casing co-acting with said first mentioned cam member to wedge said friction member against said differential casing.

2. A differential mechanism comprising a cam member positively connected to one axle, a friction member positively connected to a second axle, a second cam member co-acting with said first mentioned cam member, a housing for said members, cam surfaces on said cam members co-acting to frictionally drive said friction member, said cam surfaces being so shaped as to practically lock said friction member when the initial rotative speed of said cam members is much greater than that of said friction member and to allow a practically free rotation of said friction member when said friction member has a rotative speed only slightly greater than that of said cam members.

3. A differential mechanism comprising a cam member positively connected to one axle and to the drive gear, a differential casing bolted to said cam member, a friction disk member within said casing and positively connected to a second axle, a second cam member within said casing co-acting with said first mentioned cam member to wedge said friction disk member against said differential casing, and a coil spring member concentrically disposed between the two said cam members.

JOSEPH C. COULOMBE.